US005925961A

United States Patent [19]
Sugiyanma

[11] Patent Number: 5,925,961
[45] Date of Patent: Jul. 20, 1999

[54] PLANE CARBON COMMUTATOR AND ITS MANUFACTURING METHOD

[75] Inventor: Kenichi Sugiyanma, Tokyo, Japan

[73] Assignee: Sugiyama Seisakusyo Co., Ltd., Tokyo, Japan

[21] Appl. No.: 08/832,393

[22] Filed: Apr. 2, 1997

[30] Foreign Application Priority Data

Apr. 5, 1996 [JP] Japan ................................ P 8-084174

[51] Int. Cl.[6] .................................................... H02K 13/00

[52] U.S. Cl. .......................... 310/237; 310/233; 310/235; 310/237; 29/597

[58] Field of Search ..................................... 310/237, 233, 310/235; 29/597

[56] References Cited

U.S. PATENT DOCUMENTS

| | | | |
|---|---|---|---|
| 5,157,299 | 10/1992 | Gerlach | 310/237 |
| 5,400,496 | 3/1995 | Kemmner et al. | 29/597 |

FOREIGN PATENT DOCUMENTS

| | | |
|---|---|---|
| 0 583 892 A2 | 2/1994 | European Pat. Off. . |
| 2 286 487 | 8/1995 | United Kingdom . |

OTHER PUBLICATIONS

Background Art Information, Japanese Utility Publication No. 7–42223, Publication Date: Sep. 27, 1989, Title: Commutator of Electric Machine.

*Primary Examiner*—Nestor Ramirez
*Assistant Examiner*—Thanh Lam
*Attorney, Agent, or Firm*—Thomas, Kayden, Horstemeyer & Risley

[57] ABSTRACT

In a plane carbon commutator which is formed by fixing a plurality of metal segments to a commutator main body made of a resin and by integrally fixing a carbon to each of these segments, engagement projections provided in the carbon are engaged with engagement holes provided in the segments for a mutually fixed integration. Accordingly, it is possible to effectively utilize the characteristics of the carbon which has been burned at a high temperature in advance.

7 Claims, 10 Drawing Sheets

PLANE CARBON COMMUTATOR AND ITS MANUFACTURING METHOD

BACKGROUND OF THE INVENTION

The present invention relates to a plane carbon commutator to be used as a commutator for a motor of a fuel pump or the like, for example, and its manufacturing method, and relates more particularly to a plane carbon commutator and its manufacturing method for ensuring a coupling between a segment and a carbon in a commutator.

A plane carbon commutator has such a structure in which a metal segment is fixed to an end surface of a commutator main body made of a mold resin and a carbon is fixed to this segment. As methods for manufacturing a plane carbon commutator of this type, there are following methods (A) to (D), for example.

(A) When a carbon is molded, a metal base material which becomes a segment is inserted into the carbon for integrating these together and these are burned. Then, the metal base material integrally molded with carbon is molded with a mold resin to form an insulating material section. (For example, see Japanese Patent Application Laid-Open No. 95-264812)

(B) An insulating material and a metal base material are integrated together by an integral molding in advance, and thereafter carbon is adhered on the surface of the metal base material with solder or with conductive adhesive agent. (For example, see International Publication No. WO93/01321)

(C) An insulating material and a metal base material are integrated together by an integral molding in advance, and thereafter carbon is formed on the surface of the metal base material and burned. (For example, see Japanese Utility Model Application Publication No. 951 42223)

(D) An insulating material and a metal base material are separately prepared in advance, and the insulating material and the metal base material are inserted into carbon for integrally molding these together at the time of molding the carbon. (For example, see Japanese Patent Application Laid-Open No. 94-178503)

According to the above-described method (A), the temperature for burning the carbon is as high as at least about 600° C., so that there is a problem that the metal base material to be integrally molded is softened and this generates difficulties in the product precision and strength improvement. To avoid this problem, it is possible to burn the carbon at a low temperature of about 200° C. However, in this case, the material quality of the carbon itself becomes special with a resultant problem in various characteristics such as hardness, electric resistivity, gasoline-proof, etc.

According to the above-described method (B), the carbon can be burned as a single in advance and there is no quality problem of the carbon itself. However, in the structure of having the carbon soldered on the surface of the metal base material, there is a risk of an occurrence of a loosening of the solder due to the high temperature at the time of connection fusing for assembling the motor.

Further, in the structure of having the metal base material and the carbon adhered together by using a conductive adhesive agent, an adhesive agent having both conductivity and gasoline-proof is necessary, which results in an expensive structure. Further, even if the adhesive agent has conductivity, the electric resistance becomes larger than that of the carbon and the metal base material, holding a problem that this portion has the risk of heat generation and quality change during the operation of the motor.

According to the above-described method (C), the insulating material made of resin is carbonized at a high temperature when the carbon is burned on the surface of the metal base material, so that the carbon must be burned at a low temperature, which results in a quality problem of the carbon.

The above-described method (D) has a problem similar to that in the above-described method (C).

SUMMARY OF THE INVENTION

In the light of the above-described conventional problems, according to the present invention, in a plane carbon commutator formed by fixing a plurality of metal segments on a commutator main body made of resin and by integrally fixing a carbon to each of the segments, an engagement projection provided on the carbon is provided in the segments.

With the above-described structure, the carbon and the segments can be integrated together without using a solder or an adhesive agent so that the characteristics of the carbon burned at a high temperature in advance can be fully utilized.

Further, by engaging at least a part of the peripheral portion of engagement holes provided on the segments with an engagement projection provided on the carbon, the integration of the carbon and the segments can be achieved with higher security.

Further, by fastening the engagement projection provided on the carbon with the peripheral portion of the engagement holes provided on the segments, the integration of the carbon and the segments can be achieved with higher security.

Further, both of the segments and the carbon are plated and bonded together by welding the plating on bonding surfaces thereof to each other. This reduces contact resistance at the bonding surfaces of the segments and the carbon, thereby allowing conductivity at the bonding surfaces to be improved.

Further, in a plane carbon commutator formed by fixing a plurality of metal segments on a commutator main body made of resin and integrally fixing a carbon to each of the segments, both of the segments and the carbon may be plated and the plating on the bonding surfaces of the segments and the carbon may be welded to improve electrical conduction.

Such a configuration makes it possible to reduce contact resistance at the contact surfaces between the segments and the carbon to further improves the conductivity of the contact surfaces.

Further, the plating layers on both of the segments and the carbon may be formed by at least two plating layers, i.e., a first layer which is a plating layer compliant to the segments and the cartoon and a second layer made of a material which is compliant to the first layer and which exhibits mutual affinity when they are welded, to maintain weldability when the plating layers on the bonding surfaces of the segments and the carbon are welded.

Further, a plane carbon commutator formed by fixing a plurality of metal segments on a commutator main body made of resin and by integrally fixing a carbon to each of the segments can also be manufactured by a method comprising a step of integrating a metal base material which becomes a segment with a carbon, a step of covering an exposed portion of the surface of the carbon with the mold resin at the time of molding the metal base material and the carbon with a mold resin after the metal base material and the carbon have been integrated together, a step of disconnecting the carbon at the same time when the metal base material is disconnected into segments, and a step of removing the mold resin from the surfaces of the carbon.

According to the above-described manufacturing method, it is possible to protect the carbon with the mold resin at each processing step such as, for example, a step of bending the connection parts and a step of cutting a hole for a motor shaft, and sufficient strength of mechanical coupling between the segments and the carbon is maintained.

Further, a plane carbon commutator formed by fixing a plurality of metal segments on a commutator main body made of resin and integrally fixing a carbon to each of the segment can be manufactured by a method comprising the a step of plating each of a metal base material which becomes a segment and a carbon, a step of integrating the metal base material and the carbon, a step of heating the integrated metal base material and carbon to weld plating on the bonding surfaces of the metal base material and the carbon to each other, a step of covering the entire exposed portion of a surface of the carbon with mold resin at the time of molding the integrated metal base material and the carbon with the mold resin, a step of disconnecting the carbon at the same time when the metal base material is disconnected into segments, and a step of removing the mold resin from the contact surfaces of the carbon and brushes.

According to such a manufacturing method, it is possible to maintain sufficient strength of mechanical coupling between the segments and the carbon, to protect the carbon with the mold resin, for example, during a cutting process, and to reduce contact resistance at the contact surfaces of the segments and the carbon, thereby improving conductivity.

DESCRIPTION OF THE PREFERRED EMBODIMENTS

Figure 1A:
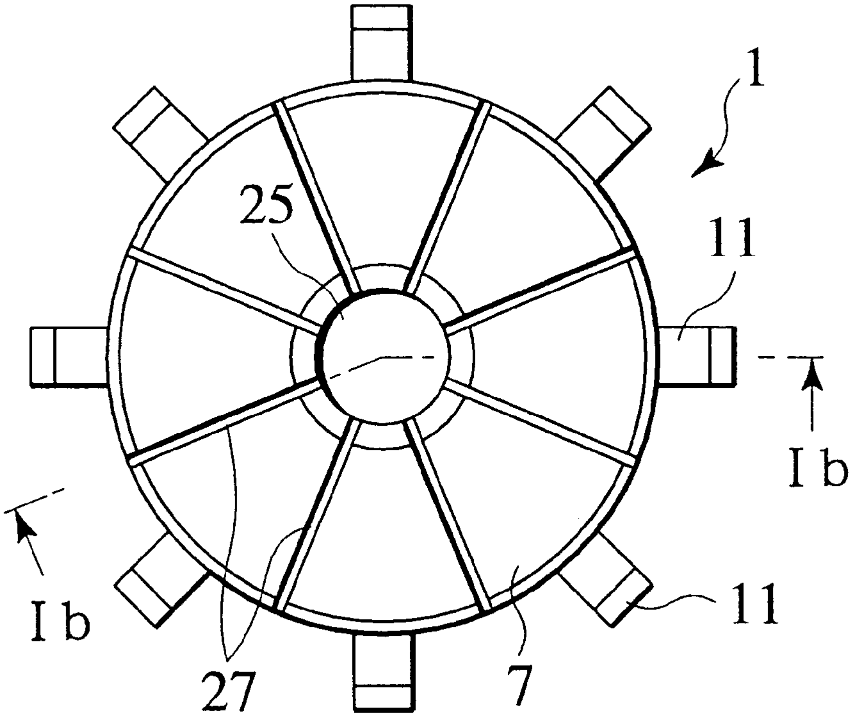
FIG. 1A is a plan view of the plane carbon commutator relating to the present invention.
Figure 1B:
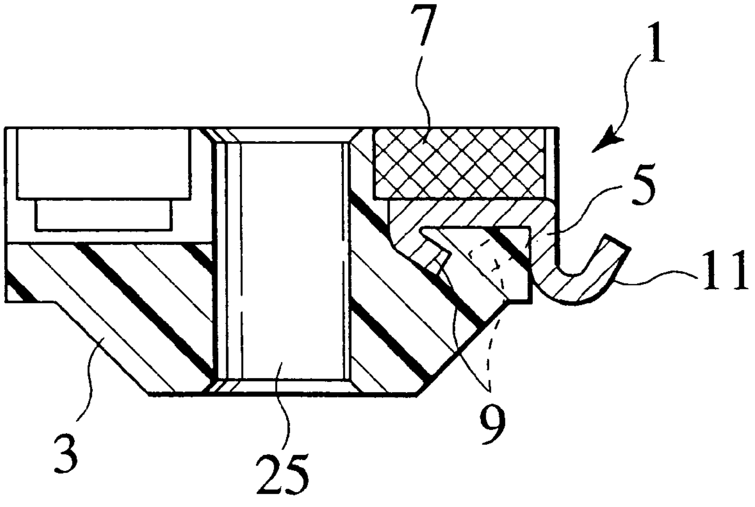
FIG. 1B is a cross-sectional view of a portion cut along the line Ib—Ib in FIG. 1A.

As shown in FIG. 1A and FIG. 1B, a plane carbon commutator 1 relating to the present invention is formed by integrally fixing a plurality of segments 5 made of a metal such as copper or copper alloy to an end surface of a commutator main body 3 made of a mold resin and by integrally fixing a carbon 7 to these segments 5.

The segments 5 include a plurality of anchor nails 9 buried in the commutator main body 3 and also include connection parts.

Figure 2:
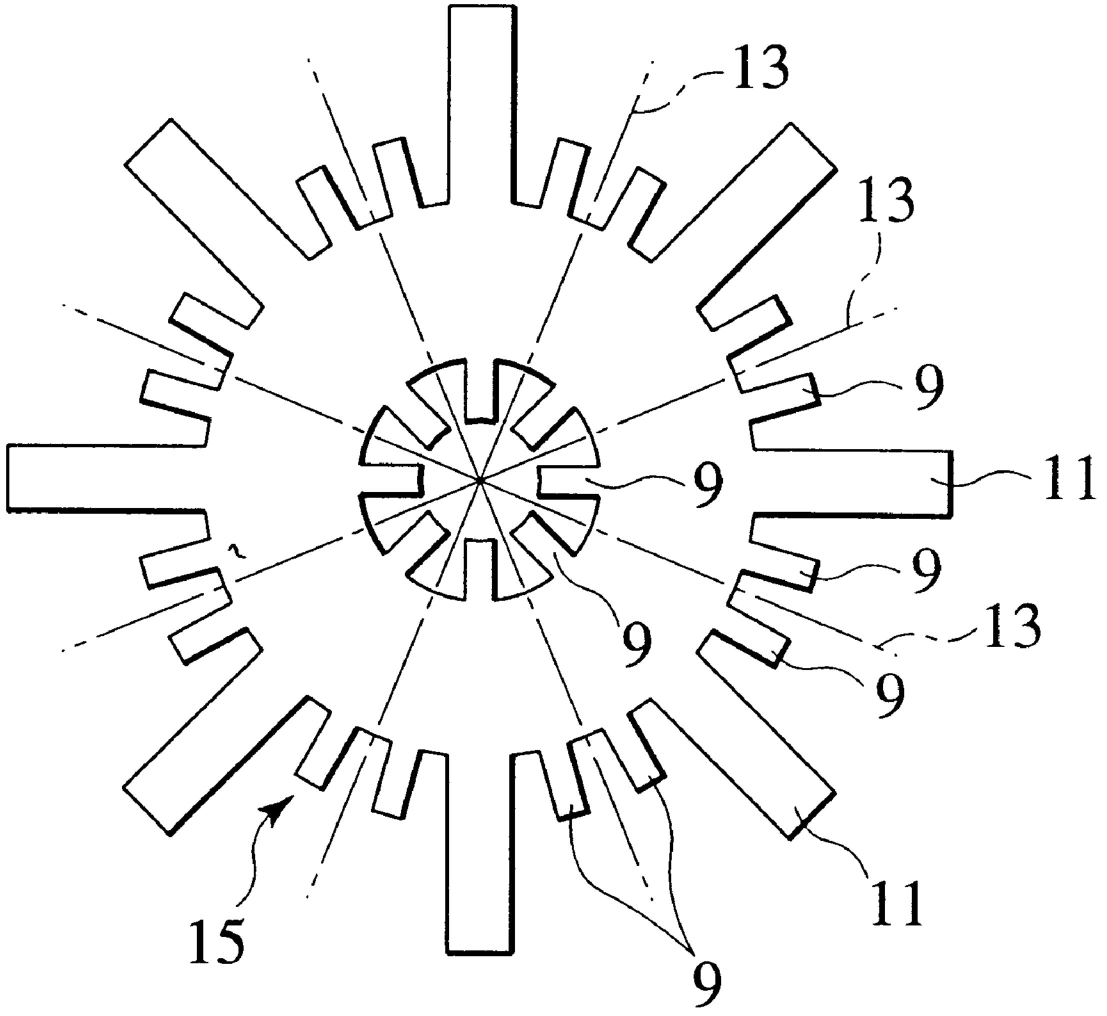
FIG. 2 is a plan view for showing the metal base material explored in a plane shape.

The commutator 1 is manufactured as follows. At first, as shown in FIG. 2, a metal base material 15 having the anchor nails 9 and the connection parts 11 is processed by punching. After punching, the metal base material 15 is disconnected by disconnection lines 13 finally so that the metal base material 15 is divided into separated portions.

Figure 3A:
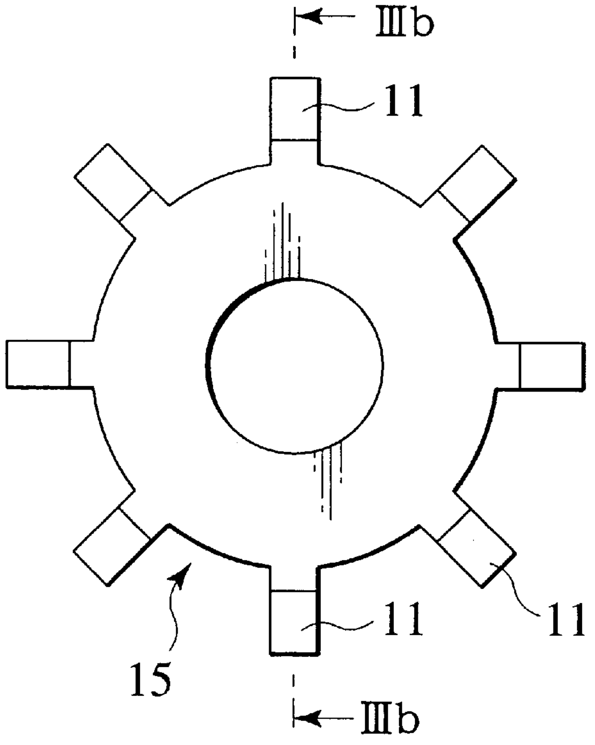
FIG. 3A is a plan view for showing the metal base material which has been bent.
Figure 3B:
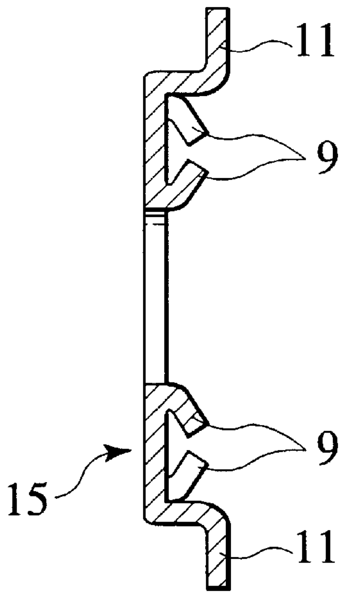
FIG. 3B is a cross-sectional view of a portion cut along the line IIIb—IIIb in FIG. 3A.
Figure 4A:
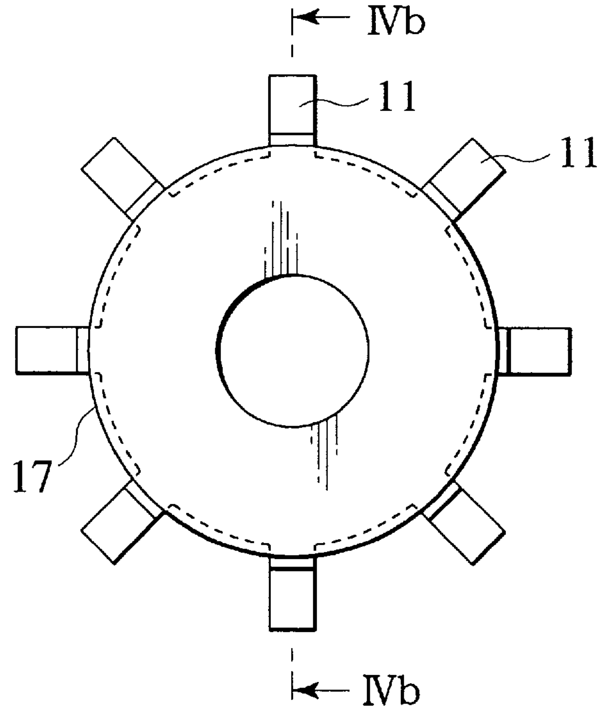
FIG. 4A is a plan view for showing the state of the carbon fitted to the metal base material.
Figure 4B:
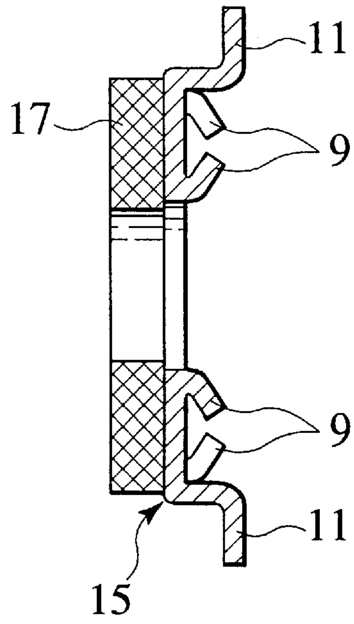
FIG. 4B is a cross-sectional view of a portion cut along the line IVb—IVb in FIG. 4A.

Next, as shown in FIG. 3A and FIG. 3B, the anchor nails 9 and the connection parts 11 provided in the metal base material 15 are bent to one side surface, and a carbon 17 which has been burned at a high temperature in a donut shape in advance is integrally fixed to the metal base material as shown in FIG. 4A and FIG. 4B.

Figure 5A:
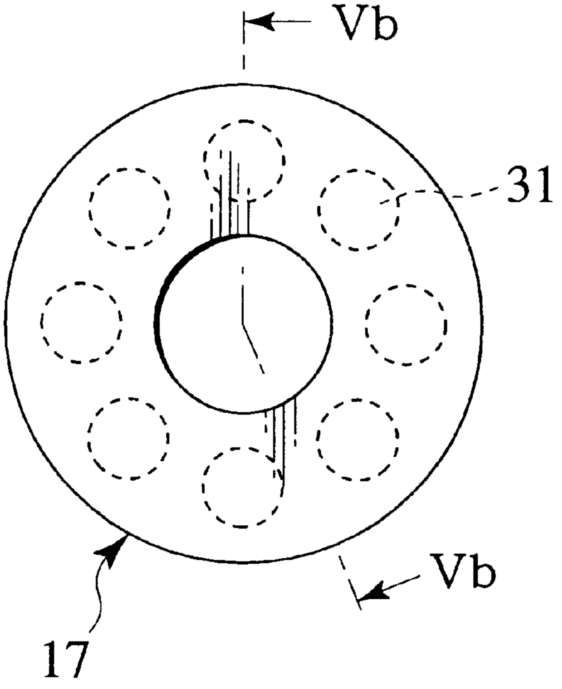
FIG. 5A is a plan view for showing the carbon.
Figure 5B:
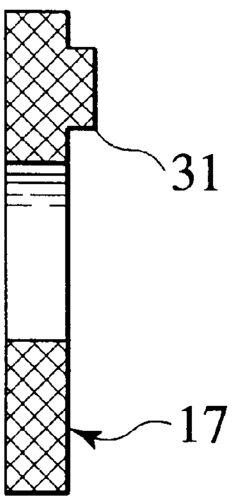
FIG. 5B is a cross-sectional view of a portion cut along the line Vb—Vb in FIG. 5A.
Figure 6:
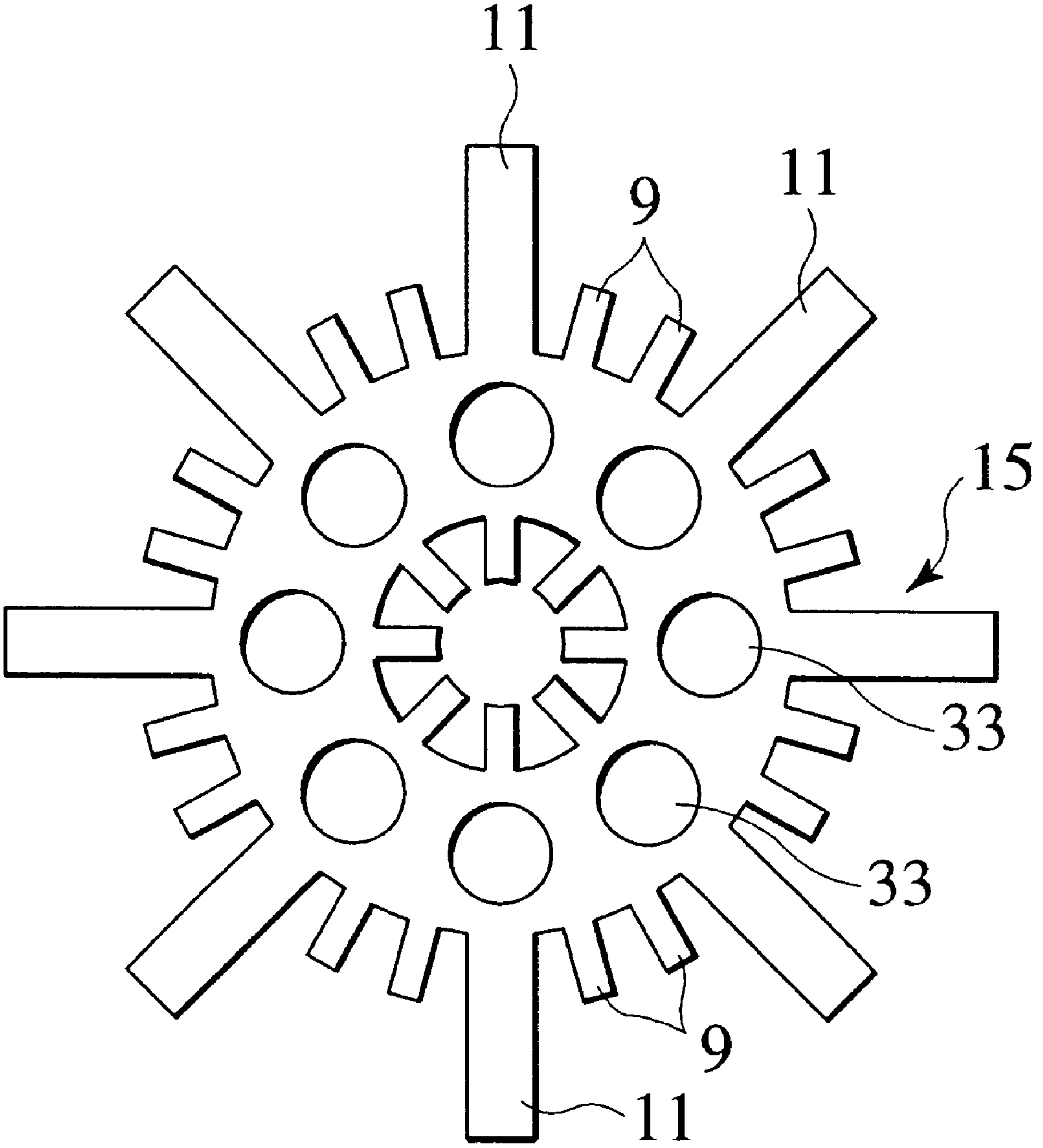
FIG. 6 is a plan view for showing the metal base material in which the engagement holes are formed.

As an example of the structure for integrally fixing the metal base material 15 with the carbon 17, there is a structure in which a plurality of engagement projections 31 are provided in the carbon 17 as shown in FIGS. 5A and 5B and then engagement holes 33 are provided at positions corresponding to the connection parts 11 of the metal base material 15 and the engagement projections 31 are engaged with the engagement holes 33 to achieve a fixed integration as shown in FIG. 6.

As an example of the structure for engaging the engagement projections 31 with the engagement holes 33 for a fixed integration, there is a structure in which the engagement projections 31 are fastened by the peripheral portion of the engagement holes 33 by utilizing the thermal compression of the material, for example, by shrinkage fit, for achieving a mutual fastening integration.

Further, it is also possible to have such a structure in which the engagement projections 31 are compressed into the engagement holes 33. In this case, it is also possible to have such a structure in which engagement holes 33 are processed by burring and engagement projections 31 are fastened by the protruding portion formed by burring.

Figure 7C:
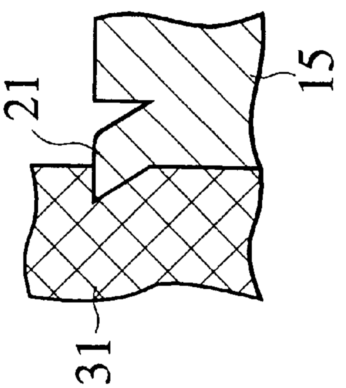
FIG. 7C is an enlarged view of a portion of VIIc in FIG. 7B.
Figure 7B:
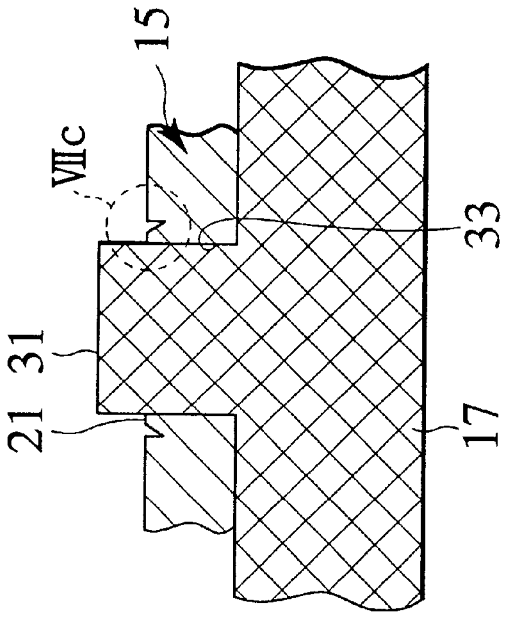
FIG. 7B is a side cross-sectional view for showing the state after caulking after the engagement projections of the carbon are engaged with the engagement holes of the metal base material.
Figure 7A:
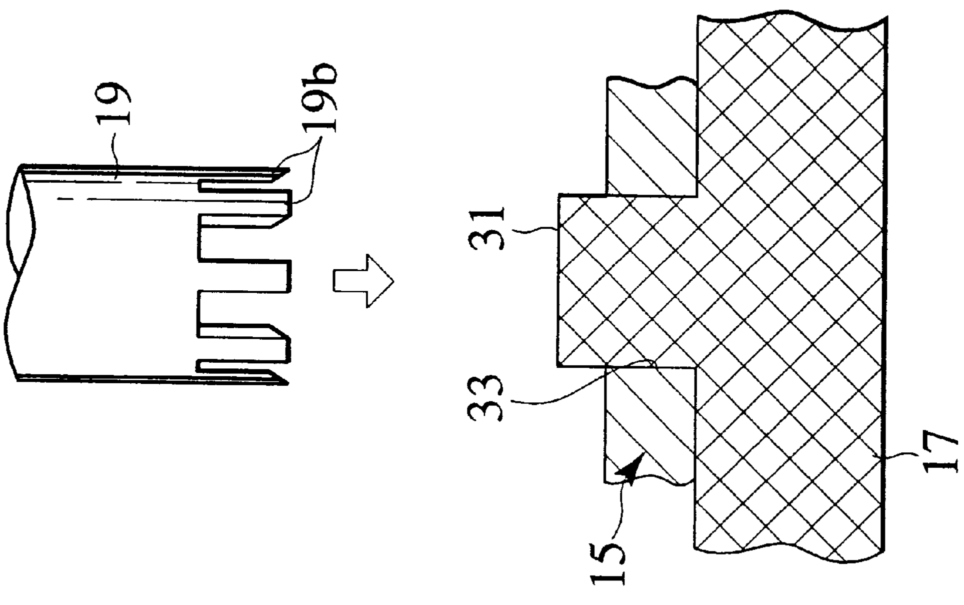
FIG. 7A is a side cross-sectional view for showing the state before caulking after the engagement projections of the carbon are engaged with the engagement holes of the metal base material.

Further, it is also possible to achieve a fixed integration of the metal base material 15 with the carbon 17 in the following manner. As shown in FIG. 7A, the engagement projections 31 of the carbon 17 are engaged with the engagement holes 33 of the metal base material 15, and then cut-open pieces 21 are formed at one portion of the peripheral edge of the engagement holes 33 in the metal base material 15 and the engagement projections 31 are fastened with these cut-open pieces 21 and the cut-open pieces 21 are filled into the peripheral surface of the engagement projections 31 so that the metal base material 15 is fixed with the carbon for integration, as shown in FIGS. 7B and 7C.

Figure 8A:
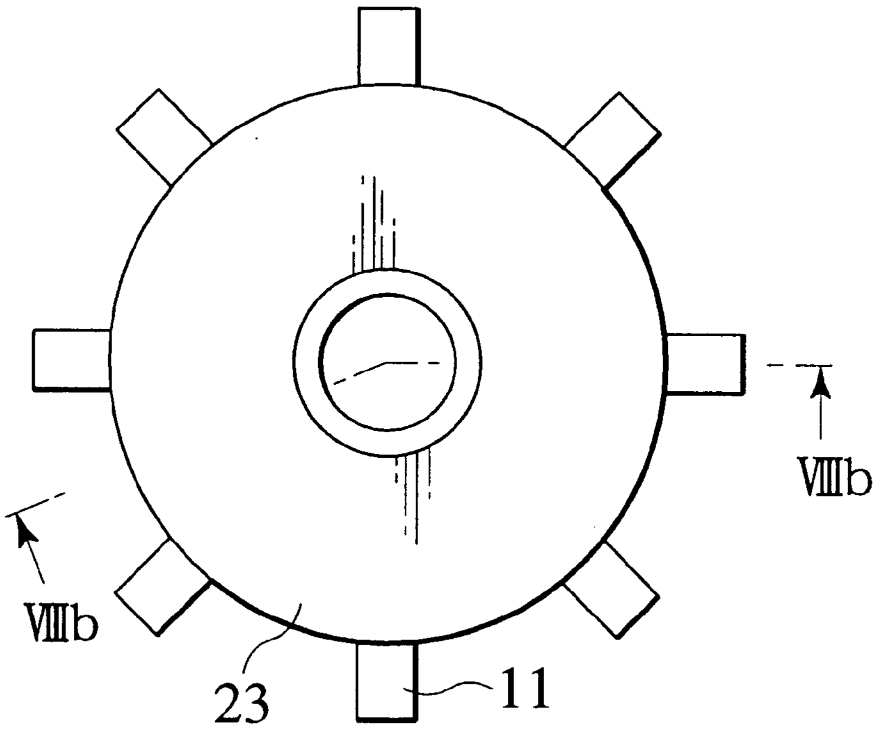
FIG. 8A is a plan view for showing the state of the carbon covered with the mold resin.
Figure 8B:
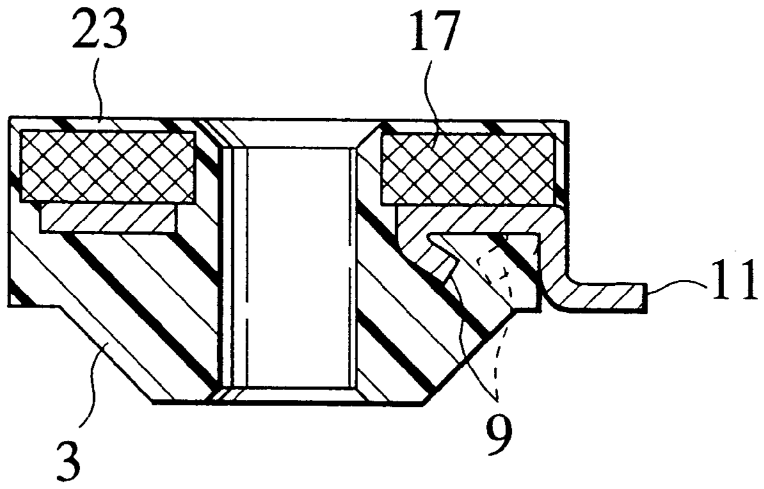
FIG. 8B is a cross-sectional view of a portion cut along the line VIIIb—VIIIb in FIG. 8A.

After the metal base material 15 and the carbon 17 have been integrated together, this integrated unit is set to a mold (not shown) and a mold resin 23 is molded to form the commutator main body 3. The mold resin 23 is molded in such a way that the exposed portion of the surface of the carbon 17 is fully covered, as shown in FIGS. 8A and 8B.

After the mold resin 23 has been molded, as shown in FIGS. 1A and 1B, a desired bending is formed at the connection parts 11, a hole 25 is provided by cutting for engaging with a motor shaft, slits 27 are processed and the carbon 17 and the metal base material 15 are divided to each segment, then the mold resin 23 is removed by cutting from the sliding surface of the carbon 17 which slides with a brush (not shown), so that the plane carbon commutator 1 of the structure as shown in FIG. 1 can be obtained.

As is clear from the above explanation, according to the present embodiment, necessary processings are carried out in the state that the exposed portion of the surface of the carbon 17 is covered with the mold resin 23, and the mold resin is removed from the sliding surface of the carbon in the final step. Therefore, in the various processing steps, the mold resin protects the carbon, with a result that there occurs no damage to the carbon such as a crack or a recess in the process of bending the connection parts 11 and the process of providing the hole 25, for example.

Further, according to the above-described embodiment, the carbon which has been burned at a high temperature in advance can be engaged with the metal main material by engaging the engagement projections with the engagement holes, to thereby achieve a fixed integration. Therefore, it is possible to utilize the characteristics of the carbon which has been burned at a high temperature and there is no problem which will otherwise occur when a solder or an adhesive agent is used.

Figure 9:
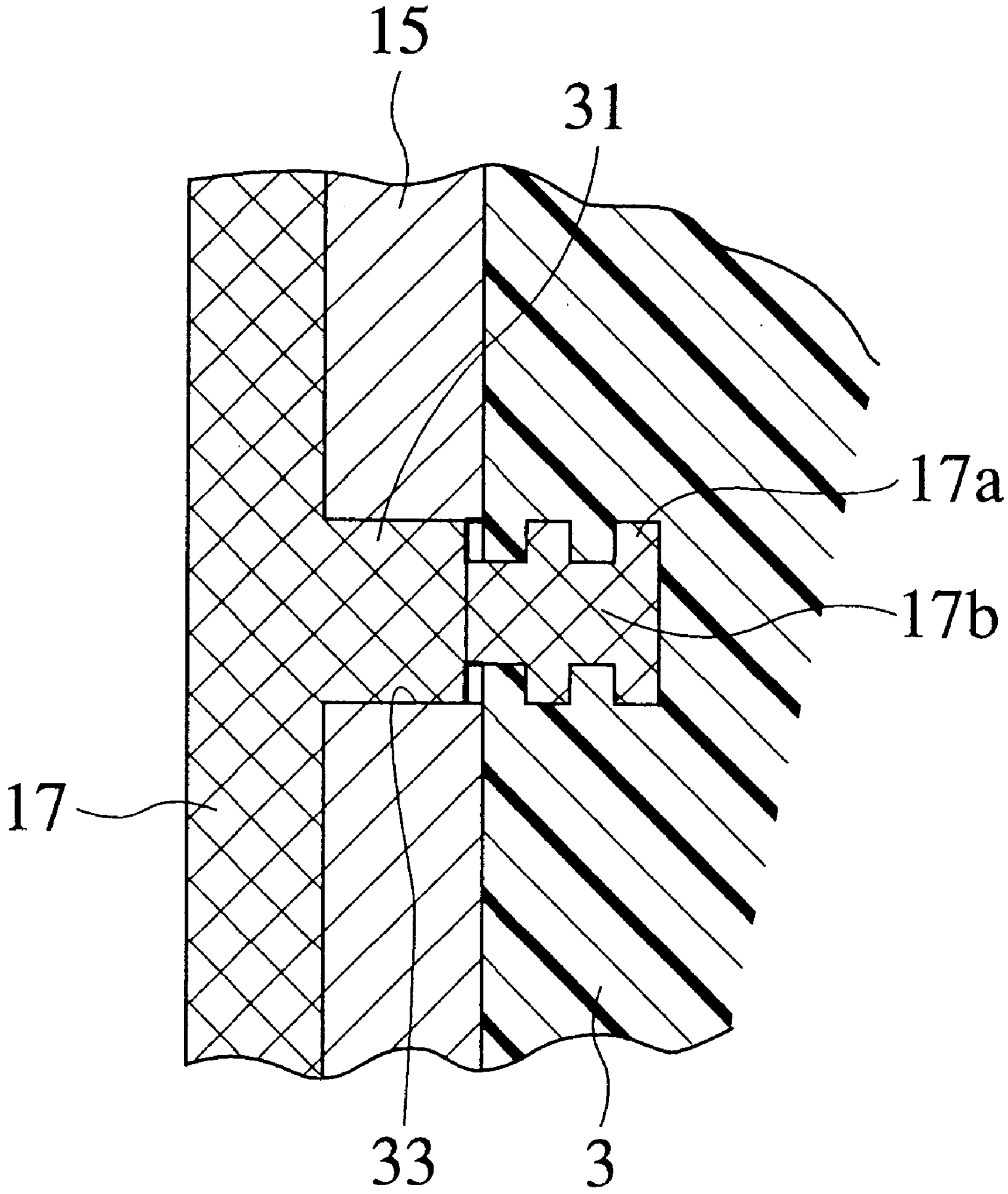
FIG. 9 is a side cross-sectional view for showing another example of a state for integrating the carbon with the metal base material.

As a structure for integrating the carbon 15 with the metal base material 15, it is also possible to have such a structure as shown in FIG. 9 in which large diameter parts 17*a* and small diameter parts 17*b* are formed at the front end portions of the engagement projections 31 of the carbon 17 which is engaged with and piercing through the engagement holes 33 of the metal base material 15, and these large diameter parts 17*a* and small diameter parts 17*b* are buried within the mold resin 3.

A second embodiment of the present invention will now be described.

Figure 10A:
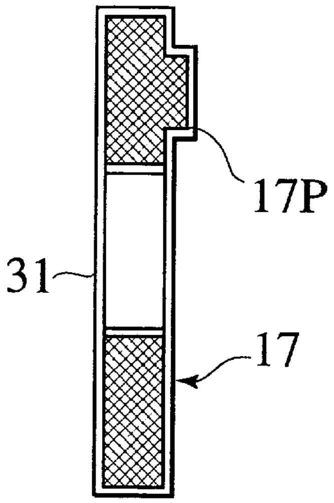
FIG. 10A is a side cross-sectional view for showing a metal base material used in an embodiment wherein the metal base material and a carbon are integrally fixed after plating each thereof.
Figure 10B:
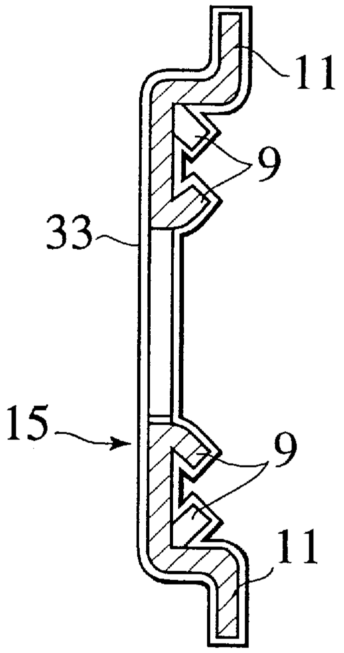
FIG. 10B is a side cross-sectional view for showing the carbon fitted to the metal base material shown in FIG. 10A.
Figure 10C:
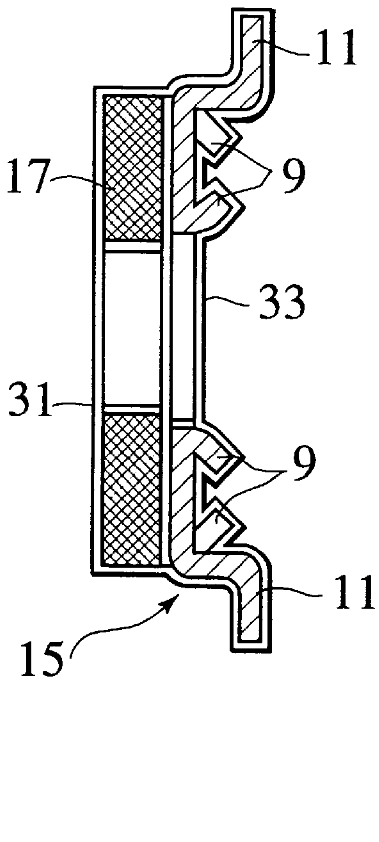
FIG. 10C is a side cross-sectional view for showing the state of the carbon shown in FIG. 10A fitted to the metal base material shown in FIG. 10B.

As shown in FIG. 10, according to the present embodiment, plating layers 31 and 33 are respectively provided on a carbon 17 and a metal base material 15; the metal base material 15 and the carbon 17 having the plating layers 31 and 33 are integrally fixed as described above; and the plating layers 31 and 33 on the bonding surfaces of the metal base material 15 and the carbon 17 are welded to each other by heating to improve electrical conduction therebetween. Subsequent manufacturing steps are similar to those described above. and will not be described here to avoid duplication.

The plating layers 31 and 33 are made of nickel, tin, chromium, gold, silver, copper, or an alloy of such materials and are preferably formed into two or more layers. In this case, a first layer is preferably made of a material compliant to each of the metal base material 15 and the carbon 17, and a second layer is preferably made of a material which is compliant to the first layer and which exhibits mutual affinity when they are welded together by heating. The plating layers are not limited two layers and may have a multiplicity of layers.

In a configuration wherein the metal base material 15 and the carbon 17 respectively have the plating layers 31 and 33 provided thereon and the plating layers on the bonding surfaces thereof are welded to each other by heating after they are integrally fixed to each other as described above, sufficient strength of mechanical coupling is maintained by a configuration wherein an engagement projection 17P provided on the carbon 17 is engaged with an engagement hole H in the metal base material 15. Further, conductivity is improved by reduction in contact resistance between the bonding surfaces compared to simple surface contact.

The effect of improving conductivity can be achieved by plating the carbon 17 and the metal base material 15 with the plating layers 31 and 33, respectively, and by bonding the bonding surfaces of the metal base material 15 and the carbon 17 through welding of the plating layers 31 and 33 to each other even if the metal base material 15 and the carbon 17 are fixed together using methods other than that described above.

What is claimed is:

1. A plane carbon commutator, comprising:

a commutator main body made of a resin;

a plurality of metal segments fixed to said commutator main body each of said metal segments including an engagement hole;

a carbon, said carbon being alone formed and burned;

said carbon having a plurality of spaced engagement projections; and said engagement projections of said carbon telescopically engaging each of said engagement holes of said metal segments to integrally fix said carbon to said segments.

2. A plane carbon commutator according to claim 1, wherein at least a part of the peripheral portion of each of said engagement holes provided in each of said segments is characterized by having been cut into each one of said engagement projections provided in said carbon.

3. A plane carbon commutator according to claim 1, wherein each one of said engagement projections provided in said carbon is fastened with the peripheral part of each one of said engagement holes provided in each one of said segments.

4. A plane carbon commutator according to claim 1, wherein both of said segments and said carbon are plated, and the plating on the bonding surfaces of both of said segments and said carbon is welded to improve electrical conduction.

5. A plane carbon commutator according to claim 1, comprising:

a commutator main body made of resin;

a plurality of metal segments fixed to said commutator main body; and a carbon integrally fixed with each of said segments, wherein the plating on the bonding surfaces of both of said segments and said carbon is welded to improve electrical conduction.

6. A plane carbon commutator according to claim 4, wherein plating layers on both of said segments and said carbon are formed by at least two plating layers.

7. A plane carbon commutator according to claim 5, wherein plating layers on both of said segments and said carbon are formed by at least two plating layers.

* * * * *